United States Patent

[11] 3,586,858

| [72] | Inventor | Arthur H. Youmans<br>Houston, Tex. |
|------|----------|------------------------------------|
| [21] | Appl. No. | 698,530 |
| [22] | Filed | Jan. 17, 1968 |
| [45] | Patented | June 22, 1971 |
| [73] | Assignee | Dresser Industries, Inc.<br>Dallas, Tex. |

[54] PERMEABILITY MEASURING SYSTEM
4 Claims, 2 Drawing Figs.

[52] U.S. Cl. .................................................. 250/83.1,
250/106
[51] Int. Cl. ...................................................... G01t 3/00
[50] Field of Search........................................... 250/43.5
FC, 43.5 R, 106 L, 83.6 W, 83.1

[56] References Cited
UNITED STATES PATENTS

| 2,480,674 | 8/1949 | Russell .......................... | 250/106 |
| 3,373,280 | 3/1968 | Mills, Jr. ........................ | 250/83.6 X |
| 3,102,956 | 9/1963 | Armistead ..................... | 250/83.6 X |
| 3,420,998 | 1/1969 | Mills, Jr. ........................ | 250/83.3 |
| 3,435,217 | 3/1969 | Givens........................... | 250/83.3 X |
| 3,133,195 | 5/1964 | Jones et al. .................... | 250/83.6 X |

*Primary Examiner*—Walter Stolwein
*Assistant Examiner*—Davis L. Willis
*Attorneys*—Robert W. Mayer, Daniel Rubin, Peter J. Murphy, Douglas M. Clarkson, Roy L. Van Winkle and William E. Johnson, Jr.

ABSTRACT: This system permits the measurement of permeability of subsurface formations in situ injecting a neutron absorber fluid and observing the progressive change in the thermal neutron absorption cross section.

ARTHUR H. YOUMANS
INVENTOR.

BY Douglas M. Clarkson
ATTORNEY.

3,586,858

PERMEABILITY MEASURING SYSTEM

BACKGROUND OF THE INVENTION

This invention, generally, relates to the art of radioactivity well logging and, more particularly, to deriving information on the permeability of subsurface formations in situ.

Economic evaluation of an oil well requires knowledge of the values for numerous parameters, not the least of which is the permeability of the subsurface formations through which the well is drilled. The permeability of a formation is a measure of the ease with which a fluid, for example oil, will flow through that formation. Many factors influence such a flow, such as temperature and pressure variations with depth in the well, and the size and tortuous path that may be available to the fluid.

Heretofore, permeability information has been obtained primarily from laboratory measurements of rock samples extracted from a well at various test depths. However, a piece of rock frequently undergoes significant changes in being removed from the temperature and pressure environment deep within the earth to a laboratory environment, and it is only in exceptional cases that these changes are reversible so that the sample can be returned to simulated subsurface conditions in the laboratory. Even more violent changes are caused in a rock sample by the methods used to obtain it, and these changes affect information sought from the rock sample as to the size and tortuous condition of the paths available for fluid flow at that test point in the well.

Accordingly, a principle object of the present invention is to provide a means for measuring permeability of subsurface formations more accurately and more reliably.

It is also an important object of the present invention to provide a new and improved method for measuring permeability without the necessity of wrenching rock samples from adjacent formations deep within a borehole.

Another object of the present invention is to provide a new and improved method for measuring permeability of subsurface formations in situ.

SUMMARY OF THE INVENTION

Briefly, the method of the present invention includes the steps of selecting a depth within a borehole at which permeability information is desired, measuring the thermal neutron absorption cross section at that depth, injecting into the formation a fluid having a different neutron absorption cross section, and then, measuring the change in the formation thermal neutron absorption cross section.

Hereinafter, thermal neutron absorption (or capture) cross section shall be referred to as "sigma."

The novel features that are considered characteristic of this invention are set forth with particularity in the appended claims. The invention itself, however, both as to its organization and method of operation, as well as additional objects and advantages thereof, will best be understood from the following description of the presently preferred embodiment thereof, when read in connection with the accompanying drawings.

DESCRIPTION OF A PREFERRED EMBODIMENT

Figures 1, 2:
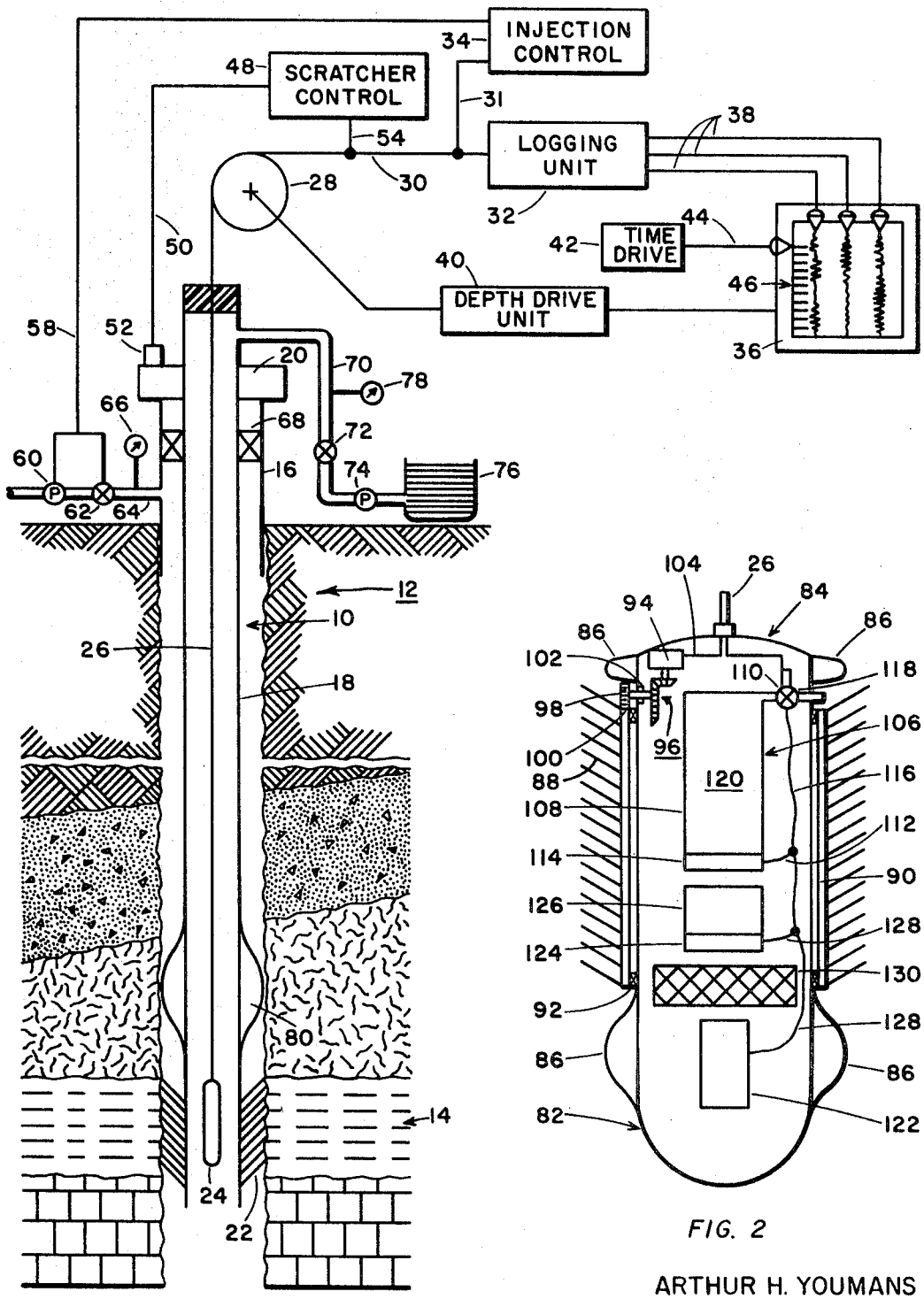
FIG. 1 is a diagrammatic illustration partly in cross section of a subsurface logging tool and surface instrumentation in accordance with the present invention.
FIG. 2 is a diagrammatic view illustrating details of one form of subsurface logging tool adapted to carry out the method of the invention.

Within the past several years, numerous types of radioactivity well logging apparatus have been introduced, and while one skilled in this art may adapt any of them for carrying out the method of the present invention, it is preferred to use an apparatus with a pulsed-neutron source. A pulsed-neutron source is used in accordance with the present invention to irradiate the formations with pulses of neutrons. The source is characterized by the fact that the pulse repetition rate is sufficiently high for many pulses to be emitted while the source is passing each foot of borehole, with the time between pulses being sufficiently long as to allow substantial decay of the neutrons from one pulse prior to the inception of the next pulse.

A radiation detector is used to obtain at least two measurements related to the neutron population in the formation at different times during the quiescent period between successive pulses. Then, these measurements are used to compute sigma for the formation by means of the following formula $$\Sigma = (C/\Delta T) \ln(N_1/N_2) \quad (1)$$

where $\ln$ denotes the base of natural logarithms and $N_1$ and $N_2$ are the counts detected respectively during two equal measuring intervals (or gates) at two different times during the period between successive neutron pulses; $\Delta T$ is the elapsed time between the beginning of the first measurement intervals and the beginning of the second measurement interval; and $C$ is a constant proportional to the reciprocal of the velocity of neutrons thermalized at the formation temperature at which $\Sigma$ is to be determined.

This $\Sigma$ is a measure of the overall or macroscopic thermal neutron absorption cross section and is also inversely related to the lifetime of the neutrons, after thermalization, in the formation.

One instrument that is used in commercial pulsed-neutron logging and that is also satisfactory for use in connection with the present invention produces neutron pulses by pulsing a positive-ion accelerator, whereby neutrons are emitted due to the well known nuclear reaction between deuterium and tritium. This instrument produces pulses with a duration of approximately 30 microseconds at a rate of about 1000 pulses per second. In this instrument, the two radiation measurements are made by gating the radiation detector on for 200 microsecond periods beginning at two selected time intervals after the initiation of the neutron pulse; detection intervals beginning at 400 and 700 microseconds, respectively, after the initiation of the neutron pulse are commonly used in commercial logging and are satisfactory for the purpose of this invention. The neutrons produced by this source have an energy of approximately 14 meu. and are quickly slowed to thermal energy during their passage through the formation material. The slowing down time and the lifetime of these neutrons after they are thermalized are determined by the elemental constituents of the formation including the fluids.

The values of sigma for subsurface formations that are potentially oil reservoirs are not all the same, and the differences in this regard between such formations is largely due to differences in the contained formation fluids. In general, the formation sigma is related to the sigma of the rock matrix and to the sigma of the formation fluid through the following equation $$\Sigma = \Phi \Sigma_f + (1 - \Phi) \Sigma_r \quad (2)$$

where the subscripts $f$ and $r$ refer to the fluid and rock, respectively, and $\Phi$ is the formation porosity.

The neutron pulse sequence and the radiation detection characteristics of the commercial instrument described above are chosen so that the measured neutron decay characteristics are primarily those related to the neutron population within the formation material as distinguished from the population within the borehole. This is because the neutrons in the borehole tend to die away before the first detection interval, at least when the borehole is filled with substances, such as salt water, which have thermal neutron capture cross sections in general greater than reservoir rocks. If on the other hand, the borehole is filled with fresh water, oil or gas, the neutron lifetime in the borehole may be as great or greater than that in the formation material, in which case the detection intervals may equally well be during some earlier portion of the period between successive neutron pulses.

Permeable formations generally are characterized by the fact that mud cakes are deposited on the portions of the formation exposed to the mud used during the drilling of the well. These mud cakes develop because the face of the formation acts as a filter and catches the solid portions of the mud as the mud filtrate invades the formation due to the hydrostatic mud pressure. The mud pressure normally exceeds the formation pressure during a successful drilling operation, since one of the primary purposes of the mud is to avoid "blowouts" of the formation fluid into the well bore, and therefore, mud cake is expected to occur in all permeable formations.

In the practice of a preferred form of the present invention, a formation is selected for investigation at a desired depth in a well, and an initial measurement of sigma is made. Then, the mud cake is removed; the fluid in the formation (the mixture of connate fluid and invaded mud filtrate) is exchanged wholly or in part with a new fluid having a different thermal neutron absorption cross section; and thereafter, a second measurement of sigma is made. The differences between the two measured values of sigma permit a determination of the pore volume swept out by the injected fluid. This is computed by means of equation No. 2.

The rate of change of sigma, i.e., the sigma change divided by the time interval during which the change occurs, is indicative of the permeability of the formation. For a given pressure differential, the permeability is directly proportional to the change in sigma per unit of time. The total change in sigma to attain equilibrium provides a means for determining the total pore volume in which the fluid is exchanged, thereby indicating whether or not all of the pore volume is associated with the permeability measured.

An alternative form of practicing the present invention adds to the above steps the making of multiple sigma measurements at specific times during the interval the fluid exchange is taking place. Correlation of the multiple measurements of sigma, indicating the progressive exchange of fluid, can then be used to determine relative permeability of the formation. Since the flow rate is determined from observation of the rate of variations in measured sigma values during the fluid exchange as described above, formations of differing permeability can readily be compared.

In the case where two formations to be intercompared have equal porosity, then the total volume exchange of fluids necessary to attain an equilibrium value of sigma will be the same, other things being equal. Thus, their respective permeabilities will be directly proportional to the relative change in sigma per unit time.

In general, formations being measured or intercompared will not have the same porosity, so that at equilibrium the change in sigma, assuming complete exchange of fluids, is proportional to porosity. Since the rate of fluid exchange is proportional to the hydrostatic pressure differential between the borehole and the formation, a general expression may be written for deriving the permeability of a formation by the present method:

$$\text{Permeability} = \frac{K_2}{P} \left[ \frac{\Sigma_{T_1} - \Sigma_{T_2}}{T_2 - T_1} \right] \frac{\Phi}{\Sigma_0 - \Sigma_\infty} \quad (3)$$

where $K_2$ is a constant, $T_1$ and $T_2$ are the times at which the measurements $\Sigma_{T_1}$ and $\Sigma_{T_2}$ are made, both being substantially before equilibrium is attained, at which time $\Sigma = \Sigma_\infty$. Prior to the operation, $\Sigma = \Sigma_0$. The porosity is $\Phi$, which in this case must be known from other considerations, such as for example, core analysis or a previously run log, e.g., a neutron log, a density log or an acoustic log.

It will be noted that in equation (3), there are two quantities which are not in all cases known, namely $\Phi$ and P, the other variables may be evaluated during the course of the present procedure. $\Sigma_\infty$ on occasion might be difficult to obtain because too long a time might be required to attain equilibrium. Any or all of these variables can be determined by making a succession of measurements with the differential pressure P altered to values $P+p_1$, $P+p_2$, $P+p_3$, etc. where $p_1, p_2, p_3$, are incremental increases in the hydrostatic pressure due to application of a corresponding pressure at the well head during the measuring procedure.

It will be evident that solutions of equation (3) can be accomplished with one set of measurements if, and only if, all parameters on the right hand side of the equation are known or are measured. If one is unknown, one additional series of measurements at a different hydrostatic pressure must be made.

If two are unknown, then two additional series of measurements are required.

For example, if the formation pressure and the porosity are the unknowns the permeability which is, of course, a third unknown, can be determined by three series of measurements, wherein: during the first series of measurements, the differential pressure is $P_o$ due to the ambient pressure of the borehole fluid; $T_1$ and $T_2$ are small compared to the time required to attain equilibrium. During the second series of measurements, the pressure is $P_1 = P_o + p_1$; during the third set, the pressure is $P_2 = P_o + p_1 + p_2$; and during which measurement $\Sigma$ still does not approach $\Sigma_\infty$. Subsequent to these measurements, injection of fluid is continued until $\Sigma_\infty$ is obtained.

Referring now to FIG. 1, a well bore 10 penetrates various earth formations 12 and, in particular, a formation of interest 14. The well bore 10 is fitted with protective casing 16 at its uppermost end, a portion of which extends above the surface to connect with the usual well head equipment. A drill pipe 18 is suspended in the well to a depth of at least as great as that of the formation of interest 14 and is engaged mechanically with a manipulator 20 mounted on the top of the casing 16. In some cases, this manipulator is simply the rotary table of the drilling rig; in these cases the upper portion of the drill pipe is the kelly, which is designed for engagement with the rotary table for transmission of torque to the drill pipe.

The mud cake on the formation of interest 14 is removed by scratchers 22, which are designed for operation by rotary movement and which are attached to the bottom joint of the drill pipe 18.

A subsurface instrument 24 is suspended by a logging cable 26 extending into the well from a hoisting unit 28 at the surface of the earth. The instrument 24 contains a pulsed-neutron source, a radiation detector, and the related circuits for generating signals representing the neutron population in the formation at different times between successive pulses of neutrons. These elements are described in more detail hereinafter in connection with another embodiment of the invention.

A hoisting unit 28 is shown schematically, because such devices are so well known in the art. Electrical circuits 30 and 31 provide interconnecting circuits between electrical conductors within the cable 26 at the hoist unit 28, a logging unit 32 and an injection control unit 34. Units 32 and 34 include all necessary electric power sources for their own operation as well as the operation of the subsurface instrument 24.

Electrical signals are generated in the instrument 24 as representations of the formation properties being measured. Such signals are transmitted to the surface by means of conductors within the cable 26; then by the circuits 30 to the logging unit 32. After processing in the unit 32, appropriate electrical signals are transmitted to the recorder 36 over circuits 38 for recording.

While any suitable means may be used to drive the recorder 36 in correlation with depth of the instrument 24 in the borehole, a conventional electromechanical driving system 40 is shown in the drawings for illustrative purposes. If desired a time drive unit 42 can be included to generate timing signals which are transmitted over circuit 44 to the recorder 36 for recording time markers 46 on the recording medium.

A scratcher control unit 48 develops an output signal which is transmitted over an electrical circuit 50 to a drill pipe manipulator control unit 52. While the signal is present at the input of the control unit 52, the manipulator 20 operates the scratchers 22 to remove the mud cake on the formation 14.

The output signal, or a related signal, from the scratcher control unit 48 is also transmitted over circuits 54 and 30 to the logging unit 32 which processes the signal and sends it to the recorder 36 for making a record of the mud cake removal operation.

The scratcher control unit 48 also generates an enabling signal which is transmitted over circuits 30 to the injection control unit 34.

The selected fluid contains a substance with a thermal neutron capture cross section different from that of the fluids initially present. For example, a fluid with a very high capture cross section can be used. A few of the many substances which have this property are compounds or mixtures of the elements boron, lithium, gadolinium, lanthanum, lutetium, and hafnium.

If the hydrostatic pressure is not sufficient to inject the borehole fluid into the formation 14, after the mud cake has been removed, or if it is desired to obtain further measurements at higher than the ambient hydrostatic pressure, the injection control unit 34 sends a signal over electrical circuits 58 to a pump 60 and valve 62, to increase the pressure at the surface of the well. Hence, the hydrostatic pressure opposite the formation 14 is increased by an amount equal to the difference in the readings of the pressure gauge 66 before and after operation of pump 60 and valve 62. The input of the pump 60 is connected to a reservoir (not shown) on the surface of a suitable fluid; this fluid can be any available fluid since any that is forced into the well will remain in the upper portion of the well bore and not affect the measurements made opposite the formation 14.

If desired, the pressure gauge 66 will have a transducer to generate signals proportional to the pressure to which the gauge is exposed. In this case, the pressure signals are transmitted over a suitable electrical circuit (not shown) to the recorder 36 to make a record of the surface pressure.

Valve 62 is of a normally closed type and is open only during the period that the pump 60 is operating in response to signals received from the circuits 58. The annulus between the drill pipe 18 and the casing 16 is closed by a seal 68 located above the junction of the casing 16 and the piping system 64. This seal 68 is such that the drill pipe may be reciprocated or rotated to remove the mud cake without permitting the well fluid to leak past seal 68. In some cases, the seal 68 is the blowout preventer which is installed on the well head during the drilling phase. In other cases, the seal 68 can be a packer.

In some uses of this embodiment of the invention, it is desirable to spot a special fluid at the depth of the formation 14 for injection into the formation. This is accomplished by providing an access to the interior of the drill pipe 18, such as by a piping system 70. This piping system 70 is connected to the drill pipe 18 as well as to a valve 72, and to a pump 74 and to a pressure gauge 78. The valve 72 and the pump 74 are analogous to the valve 62 and the pump 60, and when this use is made of the invention, the output of the circuit 58 is transferred to the valve 72 and the pump 74 to control the injection control unit 34.

The input to the pump 74 is connected to a reservoir 76 containing the fluid desired to be spotted opposite the formation 14. In practice, this fluid is ordinarily chosen to have a sigma different from that of the fluid already in the well or the mud filtrate as the case may be. Frequently, this fluid will be desired to have a very high thermal neutron capture cross section. In this case, the fluid may include compounds or mixtures of the elements boron, lithium, gadolinium, lanthanum, lutetium, hafnium, etc.

A pressure gauge 78 measures the pressure within the piping system 70, and therefore, the gauge 78 can be calibrated to read directly the pressure opposite the formation 14. If desired, this pressure gauge 78 may have connected with it a transducer to produce electrical signals proportional to the pressure to which it is exposed. These signals would be transmitted over circuits (not shown) to the recorder 36 to make a record of these pressures.

While the greatest benefit from this invention is obtained when a fluid is used that has a sigma different from that of the connate formation fluids and the mud filtrate, much useful information can be obtained by causing a controlled continuation of the invasion of the selected formation 14 by the mud filtrate. The sigma of the mud filtrate, of course, is readily determined either from a knowledge of its composition or from a measurement made on a sample.

By comparing the sigma of the formation 14 measured prior to removing the mud cake with the sigma of the formation 14 after the mud cake is removed and after the formation is exposed to the mud at the ambient hydrostatic pressure, it can be determined whether or not the formation pressure is greater than the ambient hydrostatic pressure of the mud column at that depth. If the sigma changes under these circumstances, it is known that there is a differential pressure across the face of the formation 14 at the borehole wall.

If it is known that the mud filtrate which has just invaded the formation 14 has a sigma greater than the previous mud filtrate and the connate formation fluid, an increase in sigma indicates that the pressure is higher in the borehole than in the formation and vice versa. Any observed change in the sigma after the mud cake is removed indicates that the formation is permeable by observing the time required for the formation sigma to reach its new value, i.e., the time for the formation and mud in the well to reach a new equilibrium condition. From prior experience in logging similar formations, one can infer information about the relative permeability of the formation 14. If the time is very short, the permeability is very high, and vice versa.

By increasing the pressure exerted on the formation 14 by mud (through operation of the injection control unit 34, the pump 60 and the valve 62) and measuring the sigma of the formation 14 at various pressures, further information of the character of the formation 14 is obtained; namely, the dependence of the relative permeability on well pressure. In some cases where the relative permeability is apparently low at the ambient hydrostatic pressure in the well, it is due simply to the fact that the formation pressure is very nearly equal to the ambient hydrostatic pressure. Thus, if the relative permeability increases rapidly with well pressure, one obtains an indication of the value of the formation pressure.

Two of the methods available to affect a significant change in the sigma of the mud filtrate are, first, substitute a new mud with the sigma of the filtrate increased by increasing the salinity of the mud or by adding compounds or mixtures of the elements with high macroscopic thermal neutron capture cross sections through use of the drilling rig apparatus to circulate and recondition the mud in the desired manner. The second method is by use of the reservoir 76 and operation of the valve 72 and the pump 74 by the injection control unit 34 to spot the new fluid opposite the formation 14. After such spotting, one can measure the formation sigmas before and after the mud cake is removed at either the ambient hydrostatic pressure or at increased pressures obtained through operation of the pump 60 and the valve 62.

A centralizing structure 80 is used to insure that the scratchers attack the mud cake substantially uniformly around the borehole at the test point, which in the instance being described is the formation of interest 14.

Referring now to FIG. 2 of the drawings, an embodiment is illustrated of a subsurface instrument that may be used to carry out the method of this invention. The instrument, indicated generally by the reference numeral 82, is suitable for use in most wells. The well may be cased above the formations of interest, but it must be uncased opposite the formations of interest. The surface equipment illustrated in and described in connection with FIG. 1 is suitable for use with instrument 82, and in use, the instrument 82 is connected electrically to the surface equipment through logging cable 26 which also forms the means for mechanical support and movement of the instrument 82 in the well.

The instrument 82 has pressure resistant and leak-tight housing to prevent damage to its contents, when it is subjected to the effects of the borehole fluids; and it is constructed ruggedly to resist the severe treatment to which it is subjected during normal logging operations and transportation to and from the oil fields.

Centralizing bow springs 86 are mounted on the housing 84 to keep instrument 82 centralized in the well 10 and to provide the backup forces necessary when the mud cake scratchers 88 are in operation. This centralization also improves the efficiency of mud cake removal by scratchers 88. Any of the various mud cake scratchers or wall cleaners that are commercially available in the oil industry and which are designed for mud cake removal are suitable. One form of support for the selected scratchers is to mount them on a cylinder 90 mounted on bearings 92 which in turn are secured to the housing 84, so that the cylinder 90 is rotated relative to the housing 84.

The driving force for rotating the scratcher support cylinder 90 is a motor 94 through a gear train 96 which includes a gear 98 external to the housing 84. The gear 98 meshes with a gear 100 mounted on the top of the support cylinder 90. A fluid seal and bearing 102 seals the housing 84 about the driving shaft of the gear 98. The motor 94 is energized by signals transmitted from the scratcher control unit 48 (FIG. 1) over the electrical circuits 54 and 30 to the logging cable 26 and, then, through the electrical circuits 104 to the motor 94.

Another of the distinguishing features of the subsurface instrument 82 illustrated in FIG. 2 is a fluid injection system 106 mounted within the housing 84 and which includes a reservoir tank 108 having a piping system 110 extending through the housing 84. This injection system 106 provides a means for spotting a selected fluid 120 having a known value of sigma opposite a formation of interest so that it can be forced into the formation replacing the previous formation fluid.

When it is desired to spot the selected fluid opposite a formation, the injection control unit 34 (FIG. 1) is caused to generate an appropriate electrical signal which is transmitted over the electrical circuit 30 to the logging cable 26 and, then, over the electrical circuit 112 to the reservoir control unit 114. On receipt of the injection signal, the control unit 114 sends an electrical signal over the circuit 116 to the normally closed valve 118 in the outlet piping system 110 and causes the fluid 120 contained in the reservoir tank 108 to be ejected through the outlet piping system 110 into the well bore.

The injection control unit 34 and the scratcher control unit 48 are interconnected by the electrical circuit comprised of circuit components 30, 31 and 54; so that an enabling signal from the scratcher control unit 48 can be transmitted to the injection control unit 34. The injection control unit 34 includes circuits which disables it until the enabling signal is received from the scratcher unit 48. In this way, ineffective or premature ejection of the fluid 120 from instrument 82 cannot occur.

In the event the hydrostatic heat at the instrument depth is not sufficient to cause the injected fluid to displace the mud filtrate and the formation fluid within the formation 14, further signals from the injection control unit 34 are transmitted over the circuit 58 to pump 60 and to the valve 62 to open the valve and to operate the pump 60, whereby the pressure within the well bore 10 is increased in increments as discussed above in connection with FIG. 1. The pressure at the surface of the well bore 10 can be determined by use of the pressure gauge 66. The change in the value of $\Sigma$ of the formation 14 is measured for each increment of pressure.

The sigma measuring apparatus within the instrument 82 (as well as within the instrument 24 illustrated in FIG. 1) includes a pulsed-neutron source 122, a radiation detector 124 and a detector control unit 126. A suitable neutron source is described in U.S. Pat. No. 3,309,522. A detailed description of the technique for making sigma measurements is given in my copending application Ser. No. 623,778 filed on Mar. 16, 1967, now U.S. Pat. No. 3,379,882, and Ser. No. 435,698 filed June 10, 1954, now U.S. Pat. No. 3,379,884.

In brief, the pulsed-neutron source 122 (FIG. 2) is turned on by a signal transmitted from the logging unit 32 (FIG. 1) over the electrical circuit 30 to the logging cable 26 and, then, over the electrical circuit 128 to the neutron source 122. After being turned on, the neutron source 122 automatically produces pulses of high energy neutrons with a predetermined pulse duration and pulse repetition rate and transmits synchronizing signals over the electrical circuit 128 to the detector control unit 126.

In response to the synchronizing signals, the detector control unit 126 causes the detector 124 to be turned on at least two times for predetermined periods of time during the intervals between successive neutron pulses, so that radiations induced in the formation 14 by the neutron pulses are detected and measured only during those time periods. The radiations measured are represented by signals from the detector 124 which are processed by detector control unit 126 and then transmitted to the surface over the electrical circuit 128 to the logging cable 26 and then over the electrical circuit 30 to the logging unit 32 for further processing before information is stored on the recorder 36. A radiation shield 130 prevents the direct transmission of radiations from the pulsed-neutron source 122 to the detector 124.

A further advantage of the present invention is that periodic measurements using this method will reveal relative changes in the permeability. This information forms a very valuable basis for the selection and timing of remedial and/or maintenance work on the well since permeability will change as the formation is depleted of oil. This effect is caused by two factors; one, the change in the pressure gradient driving the oil from the formation, and two, the decrease in the oil saturation. In addition, the permeability of the formation will change with time as the passageways become partially clogged with particulate matter.

The logging unit 32 and the various control units are shown diagrammatically; it is to be understood that the associated circuits and power supplies are provided in conventional manners and forms well known to those skilled in the art. Similarly, the various electrical circuits are shown for the sake of simplification as single lines in the figures; it is understood that for each circuit, the proper number and size of electrical conductors necessary to carry out the described function is intended, and those skilled in the art are fully able to construct each circuit from the above description. Likewise, electrical signals are intentionally described in generic language above, since there is no required form for any of the signals other than that they be compatible as a whole.

It should also be pointed out that there is considerable flexibility in the sequence and duration of the various steps in the methods of this invention and that, in fact, many of the steps described above are optional ones which may be used only in the solution of particular problems.

There are numerous other modifications and variations of the method and apparatus described above that are evident to those with ordinary skill in the art in the light of the above descriptions and are still within the spirit and scope of my invention.

I claim:

1. A method of measuring the character of a selected formation penetrated by a borehole, comprising:
    measuring the thermal neutron absorption cross section of said formation;
    injecting a liquid having a predetermined thermal neutron absorption cross section into said formation;
    measuring the thermal neutron absorption cross section of said formation;
    measuring the time rate of change of the thermal neutron absorption cross section of said formation after injecting said liquid;
    injecting a second quantity of said liquid at a pressure higher than the first pressure used to inject the first quantity of liquid; and
    measuring thereafter the time rate of change of the thermal neutron absorption cross section of said formation.

2. A method of measuring the character of a selected formation penetrated by a borehole, comprising:
  measuring the thermal neutron absorption cross section of said formation;
  injecting a liquid having a predetermined thermal neutron absorption cross section into said formation;
  measuring the thermal neutron absorption cross section of said formation; and
  determining a value for permeability in accordance with the equation:

$$\text{Permeability} = \frac{K_2}{P}\left[\frac{\Sigma_{T_1}-\Sigma_{T_2}}{T_2-T_1}\right]\frac{\Phi}{\Sigma_0-\Sigma_\infty}$$

where $K_2$ is a constant, $P$ is the differential pressure between that in the borehole and that in the formation, $\Sigma$ is thermal neutron absorption cross section, and $T_2$ and $T_1$ are the times at which the measurements of $\Sigma$ are made, both being substantially before equilibrium is attained.

3. A method of measuring the character of a selected formation as set forth in claim 2 wherein said predetermined thermal neutron absorption cross section of said liquid is different from that measured for said formation.

4. A method of measuring the character of a selected formation as set forth in claim 2 wherein the value of the thermal neutron absorption cross section is determined in accordance with the equation:

$$\Sigma = (C/\Delta T)\ ln\ (N_1/N_2)$$

where $N_1$ and $N_2$ are the conts detected, respectively, during two separate measuring intervals, $\Delta T$ is the elapsed time between the beginning of the first interval and the beginning of the second interval, and $C$ is a constant.